United States Patent
Round

(10) Patent No.: US 8,024,571 B2
(45) Date of Patent: Sep. 20, 2011

(54) METHOD OF AND SYSTEM FOR WATERMARKING APPLICATION MODULES

(75) Inventor: Andrew Round, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 1300 days.

(21) Appl. No.: 11/644,932

(22) Filed: Dec. 22, 2006

(65) Prior Publication Data

US 2008/0155698 A1    Jun. 26, 2008

(51) Int. Cl.
H04L 29/00    (2006.01)
(52) U.S. Cl. .................. 713/176; 713/164; 713/168
(58) Field of Classification Search .................. 713/164, 713/168, 176
See application file for complete search history.

(56) References Cited

U.S. PATENT DOCUMENTS

| | | | |
|---|---|---|---|
| 5,758,069 A * | 5/1998 | Olsen | 726/27 |
| 5,905,860 A * | 5/1999 | Olsen et al. | 726/27 |
| 7,017,043 B1 | 3/2006 | Potkonjak et al. | |
| 7,917,484 B1 * | 3/2011 | Vermeulen et al. | 707/705 |
| 2002/0046301 A1 * | 4/2002 | Shannon et al. | 709/328 |
| 2003/0191940 A1 | 10/2003 | Sinha et al. | |
| 2004/0172544 A1 | 9/2004 | Luo et al. | |
| 2007/0022469 A1 * | 1/2007 | Cooper et al. | 726/3 |

* cited by examiner

*Primary Examiner* — Vivek Srivastava
*Assistant Examiner* — Helai Salehi

(57) ABSTRACT

A method of creating and using a software application module includes coding, by a developer, a software application module for extending a functionality of a main software application. The software application module is adapted to interface with the main software application using an application programming interface (API). The method further includes compiling the software application module to produce an executable software application module, determining if the developer is authorized to use the API, and embedding a watermark in the executable software application module if it is determined that the developer is authorized to use the API. The method still further includes executing the main software application, reading the watermark from a executable software application module, verifying if the watermark is correct, and executing the software application module if the watermark is verified as correct.

32 Claims, 3 Drawing Sheets

METHOD OF AND SYSTEM FOR WATERMARKING APPLICATION MODULES

BACKGROUND

Technologies exist for determining whether a particular software application is licensed during startup of that software application. However, it is much more difficult to detect whether an application programming interface (API) used during development of a software application module used to extend the functionality of a main software application is properly licensed. A need exists for applying a license check on a particular API for developers using that API to develop code to extend the functionality of a computer application associated with that API.

BRIEF SUMMARY OF THE INVENTION

This summary is not intended to represent each embodiment or every aspect; the following paragraphs of this summary provide representations of some embodiments or aspects thereof.

A method for watermarking a software application module includes coding, by a developer, a software application module for extending a functionality, customizing, or altering a behavior of a main software application. The software application module is adapted to interface with the main software application using an application programming interface (API). The method further includes compiling the software application module to produce an executable software application module, determining if the developer is authorized to use the API, and embedding a watermark in the executable software application module if it is determined that the developer is authorized to use the API.

A method of verifying a software application module includes executing a main software application, and reading a watermark from a software application module. The software application module is used for extending a functionality of the main software application. The method further includes verifying if the watermark is correct, and executing the software application module if the watermark is verified as correct.

A method of creating and using a software application module includes coding, by a developer, a software application module for extending a functionality of a main software application. The software application module is adapted to interface with the main software application using an application programming interface (API). The method further includes compiling the software application module to produce an executable software application module, determining if the developer is authorized to use the API, and embedding a watermark in the executable software application module if it is determined that the developer is authorized to use the API. The method still further includes executing the main software application, reading the watermark from a executable software application module, verifying if the watermark is correct, and executing the software application module if the watermark is verified as correct.

An article of manufacture for watermarking a software application module includes at least one computer readable medium, and processor instructions contained on the at least one computer readable medium. The processor instructions are configured to be readable from the at least one computer readable medium by at least one processor and thereby cause the at least one processor to operate so as to: code, by a developer, a software application module for extending a functionality of a main software application, the software application module adapted to interface with the main software application using an application programming interface (API); compile the software application module to produce an executable software application module; determine if the developer is authorized to use the API; and embed a watermark in the executable software application module if it is determined that the developer is authorized to use the API.

An article of manufacture for verifying a software application module includes at least one computer readable medium, and processor instructions contained on the at least one computer readable medium. The processor instructions are configured to be readable from the at least one computer readable medium by at least one processor and thereby cause the at least one processor to operate so as to: execute a main software application; read a watermark from a software application module, the software application module for extending a functionality of the main software application; verify if the watermark is correct; and execute the software application module if the watermark is verified as correct.

An article of manufacture for creating and using a software application module includes at least one computer readable medium, and processor instructions contained on the at least one computer readable medium. The processor instructions configured to be readable from the at least one computer readable medium by at least one processor and thereby cause the at least one processor to operate so as to: code, by a developer, a software application module for extending a functionality of a main software application, the software application module adapted to interface with the main software application using an application programming interface (API); compile the software application module to produce an executable software application module; determine if the developer is authorized to use the API; embed a watermark in the executable software application module if it is determined that the developer is authorized to use the API; execute the main software application; read the watermark from a executable software application module; verify if the watermark is correct; and execute the software application module if the watermark is verified as correct.

BRIEF DESCRIPTION OF THE DRAWINGS

A more complete understanding of the disclosed methods and systems may be obtained by reference to the following Detailed Description, when taken in conjunction with the accompanying Drawings, wherein.

DETAILED DESCRIPTION OF THE INVENTION

Methods and systems will now be described more fully with reference to the accompanying drawings, in which various embodiment(s) are shown. The methods and systems may, however, be embodied in many different forms and should not be construed as limited to the embodiments set forth herein; rather, these embodiments are provided so that this disclosure will be thorough and complete, and will fully convey the scope of the systems and methods to those skilled in the art.

Embodiments of the present invention allow for the performing of a license check on a software application module used to extend a functionality, customize, or alter a behavior of a main software application to ensure that the software application module was developed using an application programming interface (API) that was properly licensed by embedding a watermark in the software application module. The watermark functions as a license indicator to indicate that the API was properly licensed by a developer. In accordance with the described embodiments of the invention, the license check is performed during execution of the main software application.

Figure 1:
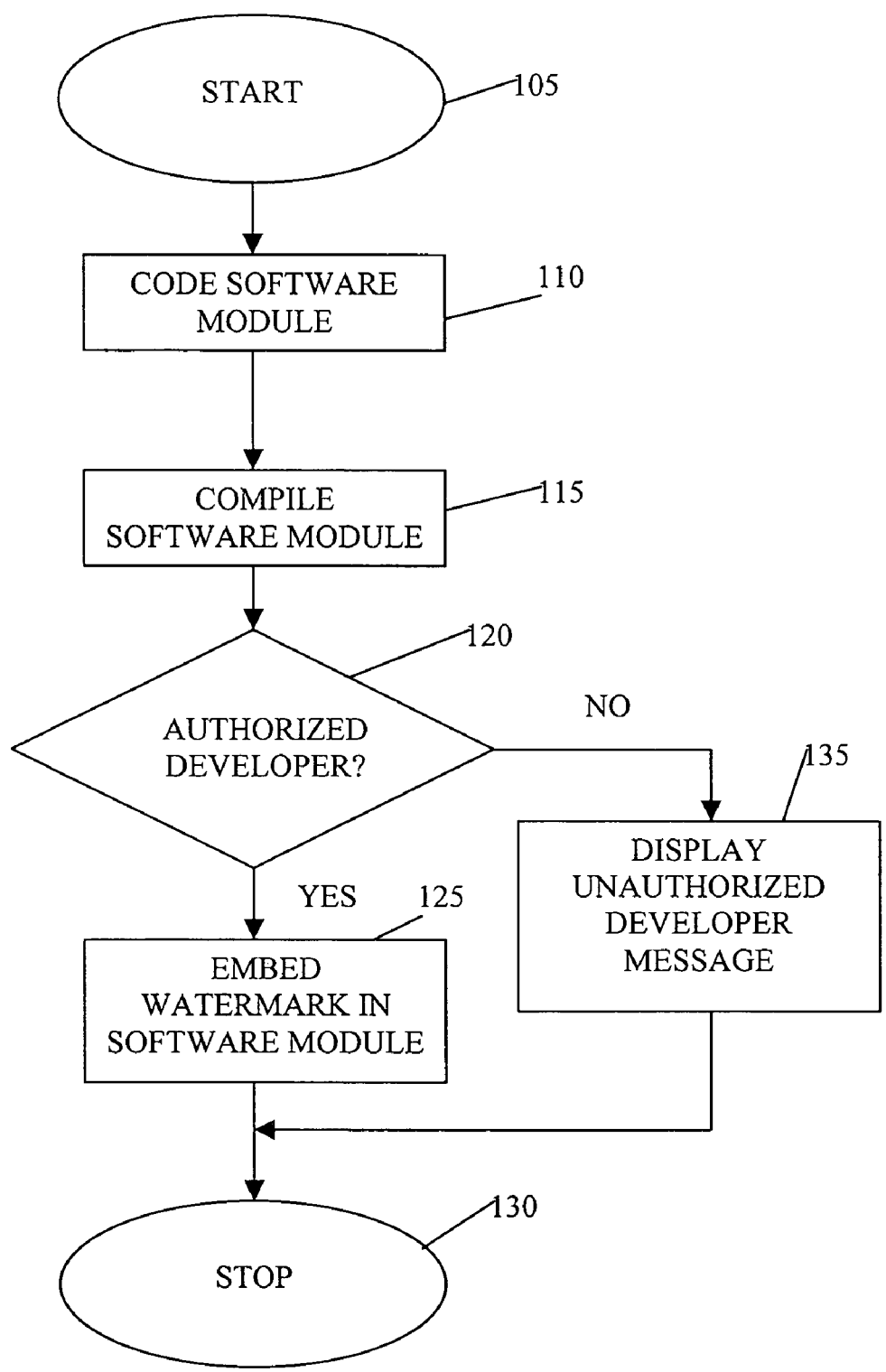
FIG. 1 is a flow diagram of an embodiment of a process for watermarking a software application module.

Referring now to FIG. 1, a flow diagram 100 of an embodiment of a process for watermarking a software application module is illustrated. In a step 105, a developer begins a process of a developing an add-on software application module (or plug-in) to extend a functionality, customize, or alter a behavior of a main software application. In a step 110, the developer codes the software application module using one or more software development applications. In accordance with various embodiments of the invention, the software development applications form part of a developers kit that allows development of a software application module that interfaces with the main software application using an application programming interface (API). The API is an interface that defines the rules the developer has to adhere to when writing their software application module which allows the software application module to interface with the main software application in order to support requests for services from the main software application to be made by the software application module in order to extend the functionality, customize, or alter a behavior of the main software application. In some embodiments, the software developers kit is a set of development tools that allow a developer to create software application modules for a particular main software application, group of software applications, or framework. The developers kit can include the API, debugging aids, and other utilities. The developers kit can further include sample code, technical notes, and other documentation to aid in the use of the API to develop a software application module to interface with the main software application.

As a part of step 110, the developer uses a development environment, such as Microsoft Visual Studio, to facilitate the development of the software application module using the developers kit. The development environment provides an integrated development environment for developing and compiling the add-on software application modules for extending the functionality, customizing, or altering a behavior of the main software application. In a step 115, the software application module is compiled by the developer to produce an executable software application module using compiler software provided by the development environment.

In a step 120, a check is made to determine whether the API is being used by an authorized developer. In accordance with various embodiments, an authorized developer is a developer who has obtained a license to use the API to develop software application modules to extend the functionality, customize, or alter a behavior of the main software application. Various procedures may be used to determine whether a particular developer is authorized. For example, in some embodiments, the check may be performed by determining whether a particular hardware dongle has been attached to a computer used to develop the software application module. In other embodiments, the check may be performed by contacting a server through a network to determine whether the particular developer computer or developer is licensed to use the API. It should be understood that other procedures for checking software licenses familiar to those of ordinary skill in the art could be used to check whether a particular developer or developer computer is authorized to use the API.

If it is determined in step 120 that the developer is not an authorized developer, the process continues to step 135. In step 135, a message is displayed to the developer indicating that the developer is not authorized to use the API, and the process continues to step 130 in which the process stops. As a result, the software application module will not be embedded with a watermark, and thus will not be allowed to executed by the main software application.

If it is determined in step 120 that the developer is an authorized developer, the process continues to a step 125. In the step 125, a watermark is embedded into the executable software application module to produce a watermarked executable software application module, and the process ends at the step 130. The watermark serves as an indication that the software application module using the API to interface with the main software application was developed and properly licensed by an authorized developer. The watermark is a derivable result coming from a "shared secret" between the main software application and the software application module. In particular embodiments, the "shared secret" is a procedure to determine what watermark should be embedded within a particular software application module. During execution of the software application module from within the main software application, the main software application first verifies that the software application module possesses the embedded watermark, and that the watermark is correct, before allowing the software application module to execute. Accordingly, the main software application allows only those software application modules that were developed by a licensed developer to be used with the main software application.

Various embodiments of processes for embedding the watermark in the software application module can be used. For example, in various embodiments, the watermark can include a particular encrypted code, and the main software application can check to insure that the particular encrypted code is embedded within the software application module. In still another embodiment, the watermark can include a checksum derived from a particular characteristic of the software application module, such as its size, modified by a particular algebraic formula to generate the checksum. In such an embodiment, the main software application determines the characteristic of the software application module and uses an identical algebraic formula to derive a checksum. The main software application can then compare the checksums to verify that the checksum from the software application module is correct.

Figure 2:
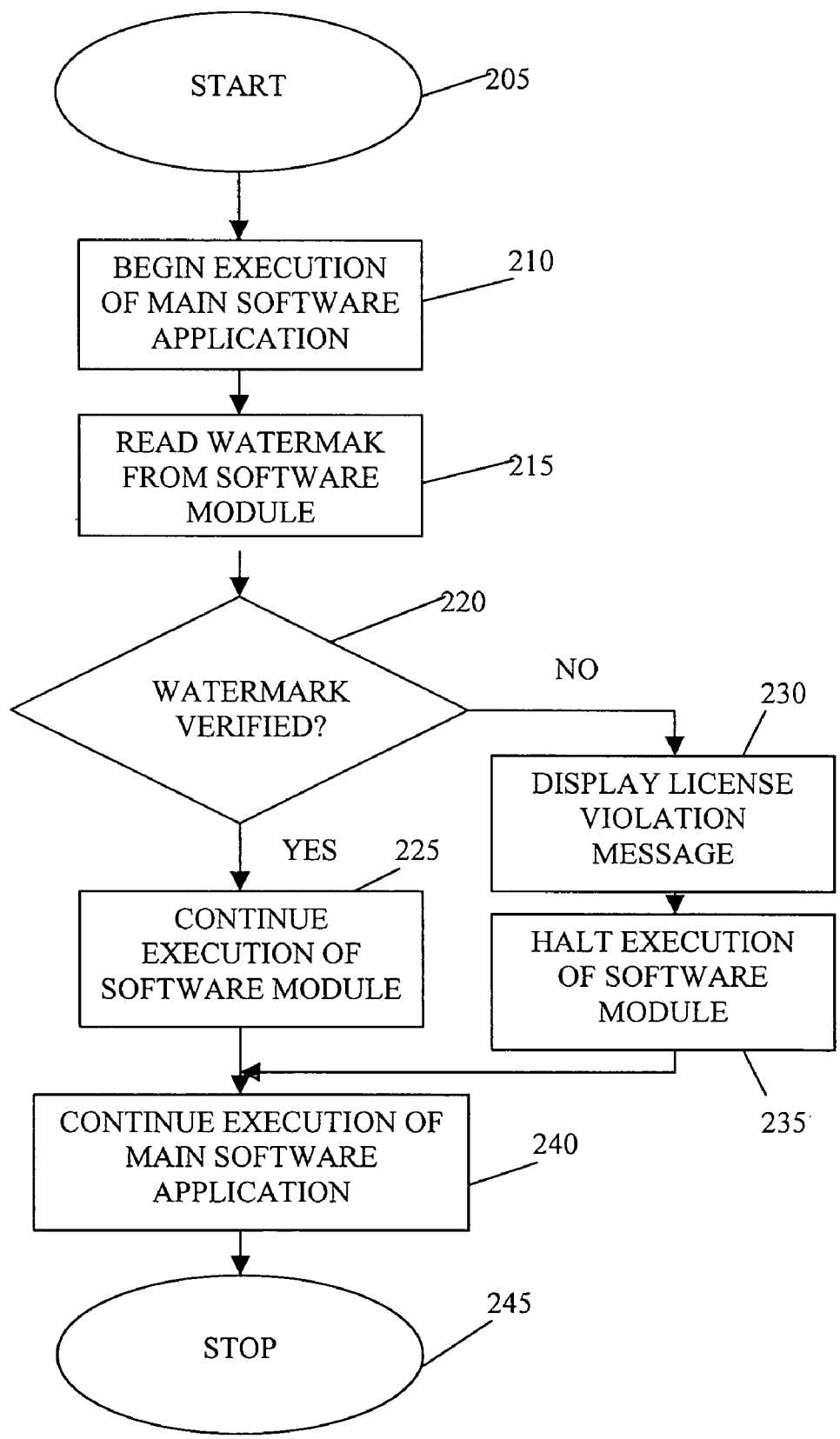
FIG. 2 is a flow diagram of an embodiment of a process for verifying by a main software application that a software application module has been watermarked.

Referring now to FIG. 2, a flow diagram 200 of an embodiment of a process for verifying by a main software application that a software application module has been watermarked is illustrated. In various embodiments, the software application module contains a watermark that has been embedded in accordance with the various embodiments described with respect to FIG. 1. In a step 205, a user of a main software application begins the process of using the main software application and the associated software application module. In a step 210, execution of the main software application is begun. In a step 215, the watermark embedded in the software application module is read from the software application module by the main software application. In accordance with some embodiments, the step 215 of reading the watermark embedded in the software application module is performed when the software application module is accessed by the main software application. In still other embodiments, the step 215 of reading the watermark embedded in the software application module is performed during the beginning of execution of the main software application.

In a step 220, the main software application verifies if the watermark obtained from the software application module is correct. If it is determined in the step 220 that the watermark obtained from the software application module is not correct, the process continues to a step 230 during which a message is displayed by the main software application that an API license violation has occurred. For example, in step 230 a message indicating that the software application module was developed using a non-licensed API can be displayed. After step 230, a step 235 is performed in which execution of the software application module halts, and the process stops to a step 240 in which execution of the main software application continues. Accordingly, the main software application can choose to not allow execution of the software application module while still allowing the other functionality provided by the main software application to continue to be used. In an alternative embodiment, the execution of the main software application can be halted as well as that of the software application module.

If it is determined in the step 220, that the watermark obtained from the software application module is correct, the process continues to a step 225 in which execution of the software application module is allowed to continue. After step 225, the process continues to step 240 in which execution of the main software application continues. After execution of the main software application is ended, the process continues to a step 245 in which the process stops.

Figure 3:
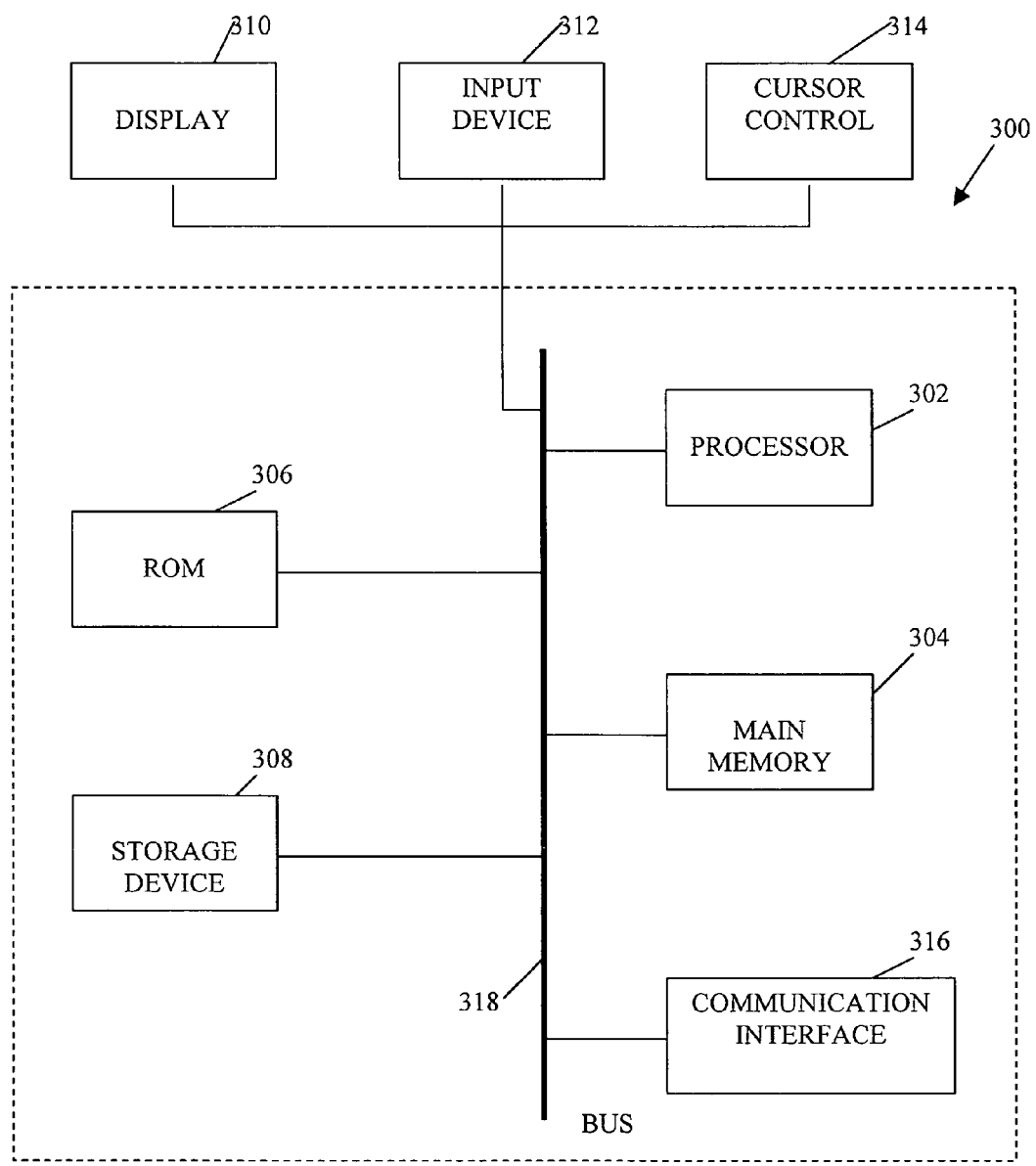
FIG. 3 is an embodiment of a developer computer for watermarking a software application module.

Referring now to FIG. 3, an embodiment of a developer computer 300 for watermarking development applications is illustrated. In the implementation shown, a developer computer 300 may include a bus 318 or other communication mechanism for communicating information and a processor 302 coupled to the bus 318 for processing information.

The developer computer 300 also includes a main memory 304, such as a random access memory (RAM) or other dynamic storage device, coupled to the bus 318 for storing computer-readable instructions to be executed by the processor 302. The main memory 304 also may be used for storing temporary variables or other intermediate information during execution of the instructions to be executed by the processor 302. The developer computer 300 further includes a read-only memory (ROM) 306 or other static storage device coupled to the bus 318 for storing static information and instructions for the processor 302. A computer-readable storage device 308, such as a magnetic disk or optical disk, is coupled to the bus 318 for storing information and instructions for the processor 302.

The developer computer 300 may be coupled via the bus 318 to a display 310, such as a cathode ray tube (CRT), for displaying information to a user. An input device 312, including, for example, alphanumeric and other keys, is coupled to the bus 318 for communicating information and command selections to the processor 302. Another type of user input device is a cursor control 314, such as a mouse, a trackball, or cursor-direction keys for communicating direction information and command selections to the processor 302 and for controlling cursor movement on the display 310. The cursor control 314 typically has two degrees of freedom in two axes, a first axis (e.g., x) and a second axis (e.g., y), that allow the device to specify positions in a plane.

The term "computer-readable instructions" as used above refers to any instructions that may be performed by the processor 302 and/or other component of the developer computer 300. Similarly, the term "computer-readable medium" refers to any storage medium that may be used to store the computer-readable instructions. Such a medium may take many forms, including, but not limited to, non-volatile media, volatile media, and transmission media. Non-volatile media include, for example, optical or magnetic disks, such as the storage device 308. Volatile media include dynamic memory, such as the main memory 304. Transmission media include coaxial cables, copper wire and fiber optics, including wires of the bus 318. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 302 for execution. For example, the instructions may initially be borne on a magnetic disk of a remote computer. The remote computer can load the instructions into its dynamic memory and send the instructions over a telephone line using a modem. A modem local to the developer computer 300 can receive the data on the telephone line and use an infrared transmitter to convert the data to an infrared signal. An infrared detector coupled to the bus 318 can receive the data carried in the infrared signal and place the data on the bus 318. The bus 318 carries the data to the main memory 304, from which the processor 302 retrieves and executes the instructions. The instructions received by the main memory 304 may optionally be stored on the storage device 308 either before or after execution by the processor 302.

The developer computer 300 may also include a communication interface 316 coupled to the bus 318. The communication interface 316 provides a two-way data communication coupling between the developer computer 300 and a network, such as an internal network, the Internet, or another external network. For example, the communication interface 316 may be an integrated services digital network (ISDN) card or a modem used to provide a data communication connection to a corresponding type of telephone line. As another example, the communication interface 316 may be a local area network (LAN) card used to provide a data communication connection to a compatible LAN. Wireless links may also be implemented. In any such implementation, the communication interface 316 sends and receives electrical, electromagnetic, optical, or other signals that carry digital data streams representing various types of information. The storage device 308 can further include instructions for carrying out various processes for watermarking software application modules as described with respect to FIG. 1.

The developer computer 300 and/or a computer similar to that of the development computer 300 can be used to perform the process for verifying by a main software application that a software application module has been watermarked as described with respect to FIG. 2.

An example environment in which the principles of the present invention can be used is the Ocean application development framework by Schlumberger. The Ocean application development framework is an open framework for geoscience, reservoir modeling, drilling, production, and economic workflows. Workflow processes supported by Ocean include well domain, stratigraphy, seismic, structural model, geomodeling, and simulation processes. The Ocean environment enables software developers to accelerate exploration, development, and production workflows. The Ocean technology provides the opportunity for extensive reuse of existing software infrastructure and low-level services, allowing developers to focus on their domain applications.

Proprietary algorithms and applications can easily be coded to work as part of the end user's workspace. Niche software providers can seamlessly integrate technology into the daily desktop workflow. The development environment is open at all levels. The open architecture enables software development groups outside of Schlumberger to take full advantage of the framework—fast tracking creation of their own applications that can interoperate with Schlumberger Information Solutions (SIS) products. Based on the .Net framework from Microsoft™, development within the Ocean environment is user friendly. With the aid of an Ocean wizard, a developer can simplify the creation and installation of new technology and expand workflows. New processes that can be added to workflows include standard interface processes, custom user interface windows, additional processes in workflow editors, and customizable menus.

The Ocean framework provides a set of interfaces, APIs, to support powerful software features, such as graphical canvases (2D and 3D), data tree, process manager, unit and coordinate system services, federated data access, security, licensing, and entitlement.

An example software application within the Ocean environment is the Petrel application. Petrel provides for integrated solutions to subsurface problems by integrating tools ranging from seismic interpretation through reservoir simulation into one application, thus eliminating import and export problems and promoting collaboration. Petrel eliminates the communication problems that exist between different software packages and associated technical disciplines. All work processes in Petrel contribute to developing and refining the same volumetric earth model, static to dynamic. Petrel includes modules for-geophysics, geology, reservoir engineering, well engineering, and a data and results viewer. An application programming interface (API) is provided with Petrel to allow developers to extend the functionality, customize, or alter a behavior of Petrel by creating software application modules that interface with Petrel.

In accordance with the principles of the present invention, a watermark can be embedded in the software application modules created for Petrel to allow for a developer license check to be performed before allowing the created software application modules to be executed by Petrel. In this particular example, a watermark is embedded in a software application module accordance with the process described with respect to FIG. 1. First a developer codes a software application module using the Petrel API that will extend the functionality, customize, or alter a behavior of Petrel. The software application module can be built using Microsoft™ Visual Studio or another development tool. The developer will then compile the software application module to produce an executable software application module. The developer-will then execute a separate watermarking program that will first determine whether the developer is licensed to use the API, and then embed a watermark in the executable software application module if it is determined that the developer is authorized to use the API. If it is determined that the developer is not authorized to use the API for development, a message will be displayed to this effect indicating the software application module will not execute from within Petrel.

When a user wishes to use the watermarked software application module from within the Petrel application, a watermark verification procedure will be performed in accordance with the process described with respect to FIG. 2. The user first starts the Petrel application and then attempts to read the embedded watermark from the software application module to verify that the watermark is correct. If the watermark is not valid, or if there is no watermark present, the Petrel application displays a license violation message and halts execution. In an alternative embodiment, upon failure of verification of the watermark, the Petrel application can continue to run, but not allow the add-on software application module to run. If the Petrel application verifies that the watermark embedded in the software application module is correct, the Petrel application allows the software application module to execute.

Although the above example has been described with respect to building software application modules for use with the Petrel application in the Ocean framework, it should be understood that the principles of the present invention can be used for developer license verification between any main software application and one or more associated software application modules developed using an API.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

I claim:

1. A method for watermarking a software application module comprising:
providing an uncompiled software application module associated with a developer, the software application module for extending a functionality of a main software application, the software application module adapted to interface with the main software application using a licensable application programming interface (API);
compiling the software application module to produce an executable software application module; and
executing a watermarking program using at least one processor to determine if the developer is authorized to develop one or more modules that use the licensable API wherein the executing comprises
receiving, via a network, license information associated with the developer and
embedding a watermark in the executable software application module if it is determined that the developer is authorized to use the licensable API wherein the watermark indicates to the main software application that the executable software application module can be executed by the main software application.

2. The method of claim 1 further comprising displaying a message indicating that the developer is not authorized to develop one or more modules that use the licensable API if it is determined that the license information indicates that the developer is not authorized.

3. The method of claim 1, wherein the watermark comprises an encrypted code.

4. The method of claim 1, wherein the watermark comprises a checksum.

5. A method of verifying a software application module comprising:
executing a main software application using at least one processor;
reading a watermark from a compiled software application module, the software application module for extending functionality of the main software application and the watermark embedded in the compiled module via a watermaking program upon determining that a developer is authorized to develop one or more modules that use a licensable application programming interface (API) of the main software application wherein the determining comprises receiving, via a network, license information associated with the developer;
verifying if the watermark is correct; and
executing the software application module if the watermark is verified as correct.

6. The method of claim 5 further comprising halting the main software application if the watermark is not verified as correct.

7. The method of claim 5 further comprising displaying a license violation message if the watermark is not verified as correct.

8. The method of claim 5, wherein the watermark is embedded after the software application module is compiled.

9. The method of claim 5, wherein the watermark comprises an encrypted code.

10. The method of claim 5, wherein the watermark comprises a checksum.

11. A method of creating and using a software application module comprising:
providing an uncompiled software application module associated with a developer, the software application module for extending a functionality of a main software application, the software application module adapted to interface with the main software application using a licensable application programming interface (API);
compiling the software application module to produce an executable software application module;
executing a watermarking program using at least one processor to determine if the developer is authorized to develop one or more modules that use the licensable API wherein the executing comprises
receiving, via a network, license information associated with the developer and
embedding a watermark in the executable software application module if it is determined that the developer is authorized;
executing the main software application;
reading the watermark from a executable software application module;
verifying if the watermark is correct; and
executing the software application module if the watermark is verified as correct.

12. The method of claim 11 further comprising displaying a message indicating that the developer is not authorized to develop one or more modules that use the licensable API if it is determined that the developer is not authorized.

13. The method of claim 11 further comprising halting the main software application if the watermark is not verified as correct.

14. The method of claim 11 further comprising further comprising displaying a license violation message if the watermark is not verified as correct.

15. The method of claim 11, wherein the watermark comprises an encrypted code.

16. The method of claim 11, wherein the watermark comprises a checksum.

17. An article of manufacture for watermarking a software application module, the article of manufacture comprising:
at least one computer readable storage medium; and
processor instructions contained on the at least one computer readable storage medium, the processor instructions configured to be readable from the at least one computer readable storage medium by at least one processor and thereby cause the at least one processor to operate so as to:
receive a software application module for extending a functionality of a main software application, the software application module adapted to interface with the main software application using a licensable application programming interface (API);
compile the software application module to produce an executable software application module;
determine if the developer is authorized to develop one or more modules that use the licensable API based at least in part on receipt of, via a network, license information associated with the developer; and
embed a watermark in the executable software application module if it is determined that the developer is authorized wherein the watermark indicates to the main software application that the executable software application module can be executed by the main software application.

18. The article of manufacture of claim 17, wherein the processor instructions are further configured to cause the at least one processor to operate so as to display a message indicating that the developer is not authorized to develop one or more modules that use the licensable API if it is determined that the developer is not authorized.

19. The article of manufacture of claim 17, wherein the watermark comprises an encrypted code.

20. The article of manufacture of claim 17, wherein the watermark comprises a checksum.

21. An article of manufacture for verifying a software application module, the article of manufacture comprising:
at least one computer readable storage medium; and
processor instructions contained on the at least one computer readable storage medium, the processor instructions configured to be readable from the at least one computer readable storage medium by at least one processor and thereby cause the at least one processor to operate so as to:
execute a main software application;
read a watermark from a compiled software application module, the software application module for extending a functionality of the main software application and the watermark embedded in the compiled module via a watermarking program upon determining that a developer is authorized to develop one or more modules that use a licensable application programming interface (API) of the main software application wherein the determining comprises receiving, via a network, license information associated with developer;
verify if the watermark is correct; and
excute the software application module if the watermark is verfied as correct.

22. The article of manufacture of claim 21, wherein the processor instructions are further configured to cause the at least one processor to operate so as to halt the main software application if the watermark is not verified as correct.

23. The article of manufacture of claim 21, wherein the processor instructions are further configured to cause the at least one processor to operate so as to display a license violation message if the watermark is not verified as correct.

24. The article of manufacture of claim 21, wherein the watermark is embedded after the software application module is compiled.

25. The article of manufacture of claim 21, wherein the watermark comprises an encrypted code.

26. The article of manufacture of claim 21, wherein the watermark comprises a checksum.

27. An article of manufacture for creating and using a software application module, the article of manufacture comprising:
- at least one computer readable storage medium; and
- processor instructions contained on the at least one computer storage medium, the processor instructions configured to be readable from the at least one computer readable storage medium by at least one processor and thereby cause the at least one processor to operate so as to:
  - receive a software application module for extending a functionality of a main software application, the software application module adapted to interface with the main software application using a licensable application programming interface (API);
  - compile the software application module to produce an executable software application module;
  - determine if the developer is authorized to develop one or more modules that use the licensable API based at least in part on receipt of, via a network, license information associated with the developer;
  - embed a watermark in the executable software application module if it is determined that the developer is authorized;
  - execute the main software application;
  - read the watermark from the executable software application module;
  - verify if the watermark is correct; and
  - execute the software application module if the watermark is verified as correct.

28. The article of manufacture of claim 27, wherein the processor instructions are further configured to cause the at least one processor to operate so as to display a message indicating that the developer is not authorized to develop one or more modules that use the licensable API if it is determined that the developer is not authorized.

29. The article of manufacture of claim 27, wherein the processor instructions are further configured to cause the at least one processor to operate so as to halt the main software application if the watermark is not verified as correct.

30. The article of manufacture of claim 27, wherein the processor instructions are further configured to cause the at least one processor to operate so as to display a license violation message if the watermark is not verified as correct.

31. The article of manufacture of claim 27, wherein the watermark comprises an encrypted code.

32. The article of manufacture of claim 27, wherein the watermark comprises checksum.

* * * * *